United States Patent [19]

Bhat et al.

[11] Patent Number: 5,684,959
[45] Date of Patent: Nov. 4, 1997

[54] METHOD FOR DETERMINING TOPOLOGY OF A NETWORK

[75] Inventors: Sunil Bhat, Colorado Springs, Colo.; Neil McKee, Bristol, United Kingdom

[73] Assignee: Hewlett-Packard Company, Palo Alto, Calif.

[21] Appl. No.: 425,940

[22] Filed: Apr. 19, 1995

[51] Int. Cl.$^6$ .................................................. G06F 13/00
[52] U.S. Cl. ................................. 395/200.11; 395/200.1
[58] Field of Search ........................... 395/800, 200.11, 395/200.1

[56] References Cited

U.S. PATENT DOCUMENTS

| | | | |
|---|---|---|---|
| 5,049,873 | 9/1991 | Robins | 340/825.06 |
| 5,185,860 | 2/1993 | Wu | 395/200 |
| 5,226,120 | 7/1993 | Brown | 395/200 |
| 5,282,270 | 1/1994 | Oppenheimer | 395/200.11 |
| 5,295,244 | 3/1994 | Dev | 395/161 |
| 5,481,674 | 1/1996 | Mahavadi | 395/200.11 |
| 5,574,860 | 11/1996 | Perlman | 395/200.06 |

OTHER PUBLICATIONS

Bhat, Sunil, Kroboth, Robert H., and Driesbach, Anne L., "The FDDI Ring Manager for the HP Network Advisor Protocol Analyzer", *Hewlett-Packard Journal*, Oct. 1994, pp. 88–96.

Bhat, Sunil, "FDDI Topology Mapping", *Hewlett-Packard Journal*, Oct. 1994, pp. 97–105.

*Primary Examiner*—Eric Coleman

[57] ABSTRACT

A system that monitors neighbor information frames (NIFs) sent by each station within a Fiber Distributed Data Interface (FDDI) network to determine the logical map of the network. After monitoring the NIFs for a period of time sufficient for all stations to have sent a NIF, the invention builds and displays a data structure containing the logical connections. If the system finds a missing connection within the network, it builds a gap structure within the data structure to display the missing connection. The system also sends a request to all stations on the network for station management information. After receiving this information from each station, the system builds and displays a data structure containing the physical connections between each of the stations within the network.

9 Claims, 16 Drawing Sheets

| | |
|---|---|
| 502 | MAC ADDRESS |
| 504 | UPSTREAM NEIGHBOR ADDR |
| 506 | DOWNSTREAM NEIGHBOR ADDR |
| 508 | PTR TO UPSTREAM NEIGHBOR MAC STRUCT. |
| 510 | PTR TO DOWNSTREAM NEIGHBOR MAC STRUCT. |
| 512 | PTR TO UPSTREAM PORT STRUCTURE |
| 514 | PTR TO DOWNSTREAM PORT STRUCTURE |

FIG. 5

| STATION ID | STATION NAME |
|---|---|
| TYPE | NUMBER MACS |
| NUMBER M PORTS | NUMBER A/B/S PORTS |

1302

| PORT 1 TYPE | PORT 1 STRUCTURE PTR |
|---|---|
| PORT 2 TYPE | PORT 2 STRUCTURE PTR |
| PORT N TYPE | PORT N STRUCTURE PTR |
| MAC | MAC STRUCTURE PTR |

| TYPE, STATUS | STATION STRUCTURE PTR |
|---|---|
| RING CONNECTED TO | REMOTE PORT STRUCTURE PTR |
| PREVIOUS PORT STRUCTURE | NEXT PORT STRUCTURE PTR |

METHOD FOR DETERMINING TOPOLOGY OF A NETWORK

FIELD OF THE INVENTION

This invention relates to computer systems and more particularly to networks of computer systems. Even more particularly, the invention relates to determining and displaying the physical connections of a network.

BACKGROUND OF THE INVENTION

Fiber Distributed Data Interface (FDDI) networks offer high-speed data transfer and fault-tolerant dual-ring topology, but can add a layer of complexity to troubleshooting network problems. The dual ring of such networks can become twisted or wrapped, a serious problem that may not be immediately apparent. Interoperability issues can cause ring abnormalities between products from different vendors, but tracing these glitches to their source by looking at decodes of the network information data frames can be intensely time consuming. The FDDI station management protocol defines a management information base (MIB) full of interesting information, but it may not be convenient to access and make sense of that information.

Topologically, a FDDI network forms a dual ring of trees or a subset thereof. This is because all FDDI trunk ring links are duplex. These duplex links are used as two separate counter rotating rings, and in the event of a fault within the trunk rings, the two rings wrap around the fault forming a single unified ring.

Central to most network management products is some form of network topology mapping. This type of map helps in the management of the devices on the network and provides a context for troubleshooting network problems.

One problem that exists in prior art topological mapping systems is that they do not produce a physical map of the connections between the various stations of the network. The logical map of a FDDI network and the physical map of that same network can be quite different. This is because of network components such as concentrators which connect a plurality of devices, or sub-networks, at a single point within the network. Further, concentrators can be connected in series to produce even more complex networks. In a logical map of the network, a concentrator will be displayed at a single location, however, many physical connections may be made between the concentrator and the devices connected to it. Thus, a logical map does not usually provide a complete description of the physical connections within the network.

There is a need in the art for a system that produces a physical map of a FDDI network. The present invention meets this and other needs in the art.

The articles "The FDDI Ring Manager for the HP Network Advisor Protocol Analyzer", by Sunil Bhat, Robert H. Kroboth, and Anne L. Driesbach, *Hewlett Packard Journal*, Volume 45, Number 5, October, 1994, pp 88–96, and "FDDI Topology Mapping", by Sunil Bhat, *Hewlett Packard Journal*, Volume 45, Number 5, October, 1994, pp 97–105, are each incorporated herein by reference for all that is disclosed and taught therein.

SUMMARY OF THE INVENTION

It is an aspect of the present invention to display a logical map of a FDDI network.

It is another aspect of the invention to display a map of the physical connections within a FDDI network.

Another aspect of the invention is to determine gaps within the logical or physical connections of a FDDI network.

The above and other aspects of the invention are accomplished in a system that monitors neighbor information frames sent by each station within a FDDI network to determine the logical map of the network. After monitoring the NIFs for a period of time sufficient for all stations to have sent a NIF, the invention builds a data structure containing the logical connections. If the system finds a missing connection within the network, it builds a gap structure within the data structure to display the missing connection.

The system also sends a request to all stations on the network for station management information. After receiving this information from each station, the system builds a data structure containing the physical connections between each of the stations within the network.

The system allows the user to set timers that define how often the system repeats the data collection process to display an updated map of the network.

BRIEF DESCRIPTION OF THE DRAWINGS

The above and other objects, features, and advantages of the invention will be better understood by reading the following more particular description of the invention, presented in conjunction with the following drawings, wherein:

FIG. 5 shows a block diagram of the MAC data structure used by the processes of FIG. 3 and FIG. 10;

FIG. 13 shows a block diagram of the station data structure used by the process of FIG. 10;

FIG. 14 shows a block diagram of the port data structure used by the process of FIG. 10;

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
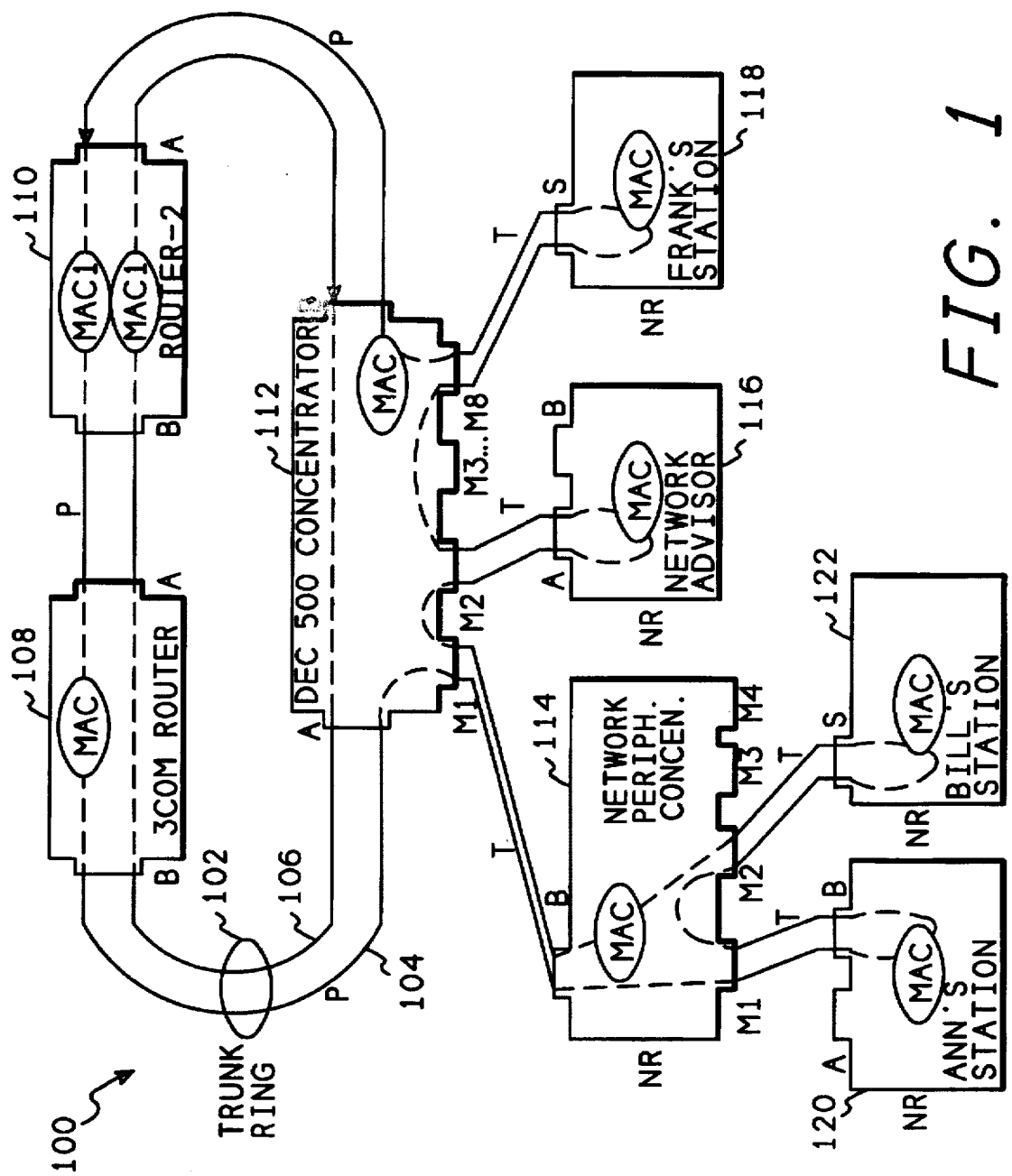
FIG. 1 shows a network containing the method of the present invention.

FIG. 1 shows a network diagram of a network containing the mapping system of the present invention. Referring to FIG. 1, a Fiber Distributed Data Interface (FDDI) network is comprised of a trunk ring with trees emanating from the trunk ring. Topologically, a FDDI network forms a dual ring of trees or a subset of a dual ring of trees. This is because all FDDI trunk links are duplex, which results in two separate counter rotating token rings.

A FDDI network 100 has a trunk ring 102 with a primary token ring 104 and a secondary token ring 106. Because of this duplex nature, in the event one of the stations on the trunk ring has a fault, the two rings wrap around the fault forming a single unified ring.

There are three stations on the trunk ring 102: the first station is a 3COM router 108; the second station is ROUTER-2 110; and the third station is the DEC 500 CONCENTRATOR 112. The stations on the trunk ring are considered to be rooted, and any other stations within the network that are connected to rooted stations, for example to the network advisor 116, are not rooted because they do not connect directly to the trunk ring 102.

Connected to the DEC 500 concentrator 112 through port M1 is a second concentrator, peripheral concentrator 114. Connected to the peripheral concentrator 114 through its port M1 is Ann's Station 120 and through port M2 of the peripheral concentrator 114 is Bill's Station 122. Connected to the M2 port of the DEC 500 concentrator 112 is the Network Advisor 116 which contains the mapping system of the present invention. Connected to the last port M8 of the DEC 500 concentrator 112 is Frank's Station 118.

The dashed lines inside the various stations and the solid lines outside the various stations show the path that a token would take as it traverses the ring. For example, a token starting with the 3COM router 108 and traversing the primary ring would go to the DEC 500 concentrator 112, then out port M1 to the network peripheral concentrator 114, and then out concentrator 114 port M1 to Ann's Station 120. The token would then traverse back to port M1 of the peripheral concentrator 114 and out port M2 of the peripheral concentrator 114 to Bill's Station 122. The token would then exit Bill's Station back through port M2 of the peripheral concentrator 114 and back to port M1 of the DEC 500 concentrator 112. The token would then exit port M2 of the DEC 500 concentrator 112, go to the Network Advisor 116, and then return to port M2 of the DEC 500 concentrator 112. The token would then exit port M8 of the DEC 500 concentrator 112, go to Frank's Station 118, return to port M8 of the concentrator 112 and then go to ROUTER-2 110 before returning to the 3COM router 108. This entire path of traversing for the token is called the token path. The token path is important because it defines the logical view of the network.

Each node or station on a FDDI network connects to the network via a port; which provides one end of a connection with another station. There are four types of ports: A, B, S, and M. Each connection is supported by a link which comprises a full duplex fiber optics or copper cable. Each connection also has a mode associated with it. Peer mode connections are formed only on the trunk ring, and use the A and B types of ports. Tree mode connections are used to connect stations to concentrators, and use M, A, B, and S types of ports.

Within each station is at least one Media Access Control (MAC) element, which communicates over the network. The MACs send information frames over the network, and perform station management functions. Station management is responsible for network reliability as well as management. It incorporates a management information base (MIB) that can be queried remotely using information frames. The station management information frames that supply information from the MIB are the Neighbor Information Frame (NIF) and the Station Information Frame (SIF).

Each MAC generates a NIF at least once every thirty seconds, which allows other stations on the network to monitor topological changes on the network. A NIF sourced by a MAC contains its Upstream Neighbor Address (UNA), which allows each MAC to update its Upstream Neighbor Address each time it receives a NIF. NIFs include a description of the station, including the type of the station, number of MACs, port resources, the status of the station such as wrapped or twisted, and the Upstream Neighbor Address of the logical upstream neighbor MAC.

Station information frames are used to require detailed station information in a packaged form. Configure and operation SIF responses contain configuration and operation information for each resource within the station, over and above the basic information contained in NIFs. This information is available only by actively querying the station, and it includes basic station information contained in the NIFs, and path descriptor information for the internal token path within the station, as well as timer values and various frame counts for each MAC resource in the station.

Figure 2:
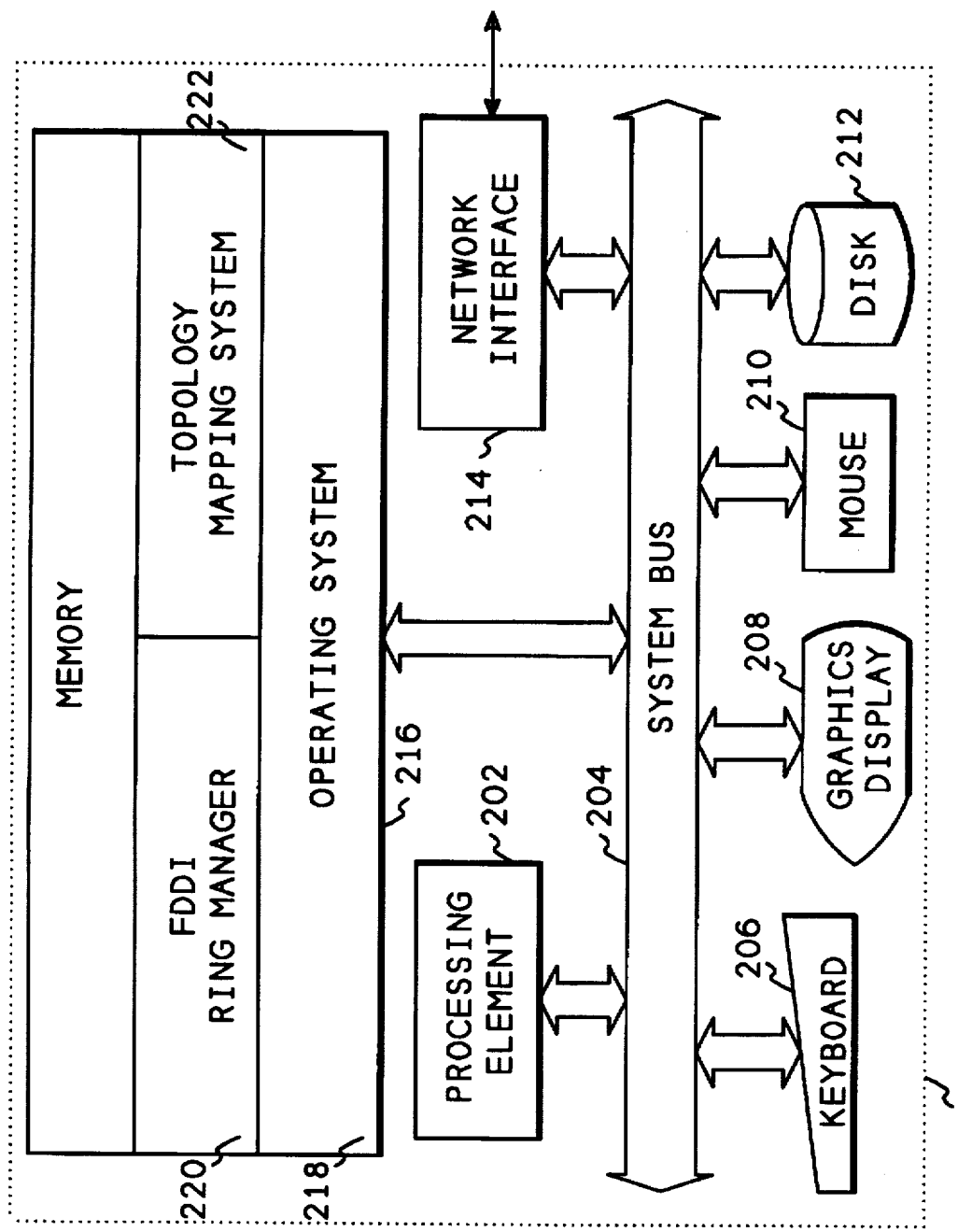
FIG. 2 shows a block diagram of the network advisor station containing the method of the present invention.

FIG. 2 shows a block diagram of the network advisor station 116 of FIG. 1. Referring now to FIG. 2, the network advisor station 116 contains a processing element 202 which communicates to other elements of the network advisor 116 over a system bus 204. A keyboard 206 and a mouse 210 provide input to the station 116 and a graphics display 208 allows software within the station 116 to output information, such as the logical and physical maps of the FDDI network 100, to a user of the network advisor station 116. A disk 212 stores the software and data of the present invention and a network interface 214 allows the system 116 to interface to the FDDI network.

A memory 216 of the network advisor station 116 contains an operating system 218. The memory 216 also contains the FDDI ring manager software 220 which calls the topology mapping system 222 of the present invention.

When a user of the network advisor 116 wants to perform a topological mapping operation, they interface through the FDDI ring manager 220 which calls the topology mapping system 222 of the present invention.

Figure 3:
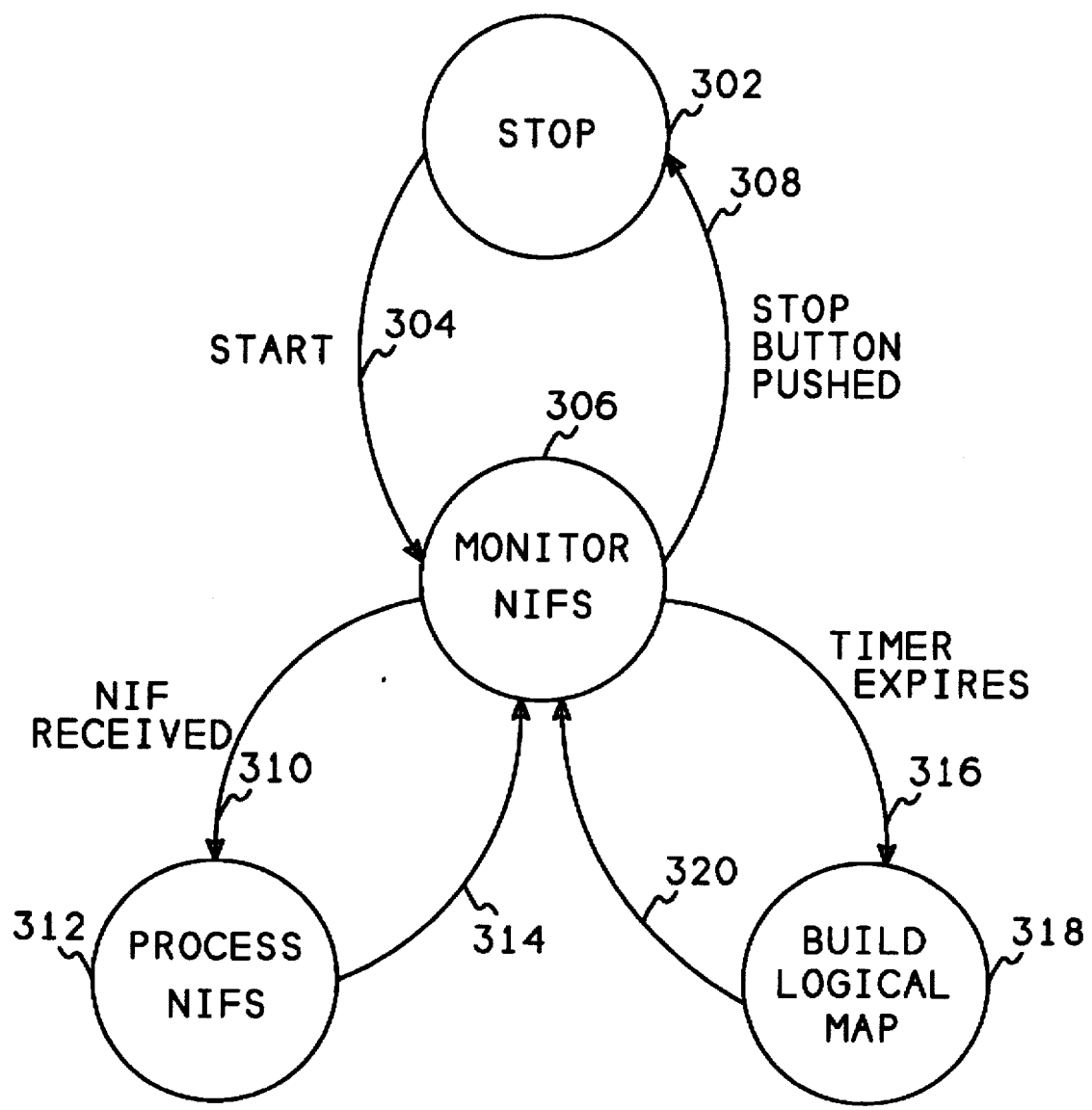
FIG. 3 shows a state diagram of the software for logically mapping the network.

FIG. 3 shows a state diagram of the software for logically mapping the network. Referring now to FIG. 3, when the user of the system wants to see a logical map, they cause the FDDI ring manager software to call the state diagram of FIG. 3 at the STOP state 302. When the user presses a start button on the screen of the network advisor, the state diagram moves to the MONITOR NIFs state 306. While moving from the STOP state 302 to the MONITOR NIFs state 306, the system sets a timer for thirty-one seconds, which is an adequate time to receive neighbor information frames from all of the stations on the network.

When a NIF is received, state 306 goes to PROCESS NIFs state 312 which performs the flowchart of FIG. 4, discussed below. After processing the NIF, state 312 returns to state 306 to wait for additional NIFs to be received over the network. Once the monitor timer expires, state 306 goes to state 318 which builds the logical map, by performing the process of FIG. 6, discussed below. After building the logical map, state 318 returns to state 306. The system will stay in this state to continuously update the logical map until the user pushes the stop button on the screen, at which time state 306 transits back to the STOP state 302.

Figure 4:
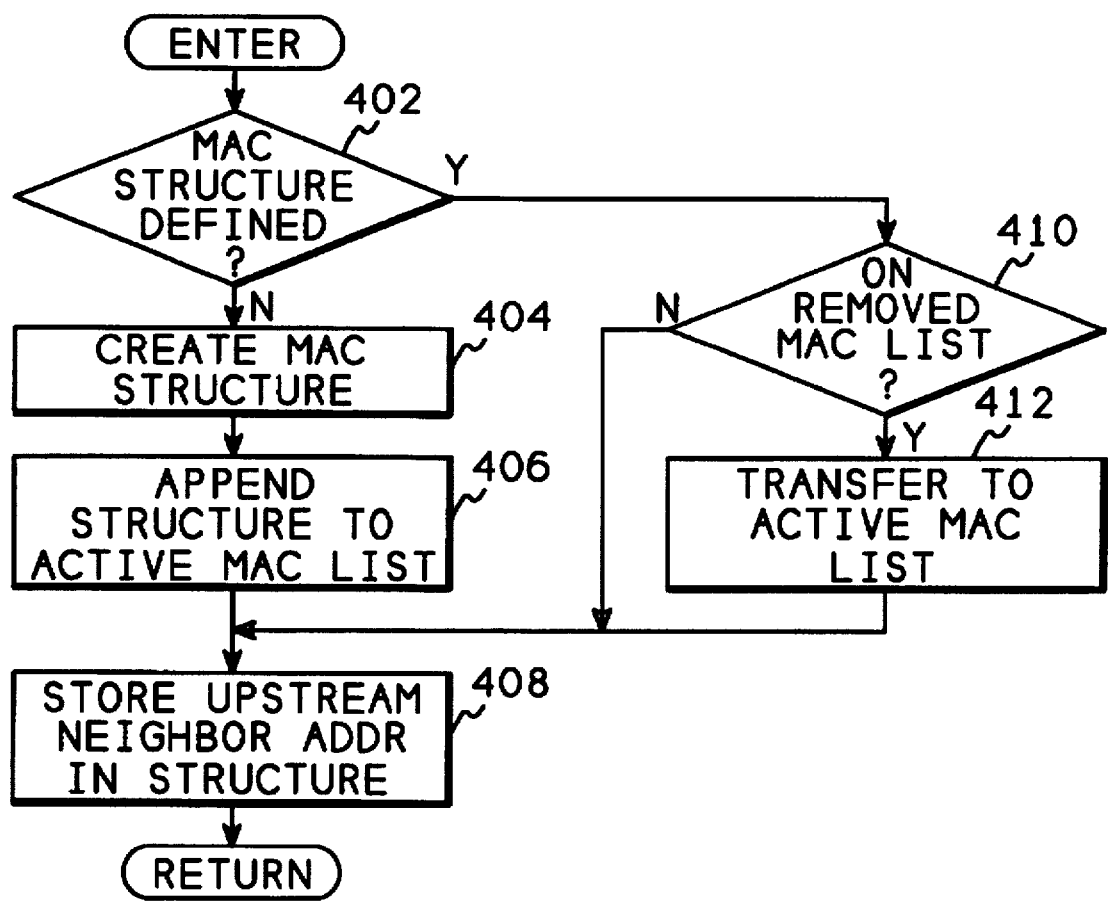
FIG. 4 shows a flowchart for processing neighbor information frames of the PROCESS NIFs state of FIG 3.

FIG. 4 shows a flowchart of the PROCESS NIFs state 312 of FIG. 3. Referring now to FIG. 4, after entry, block 402 determines whether there is a MAC structure already defined for the station that sourced (i.e. generated) the neighbor information frame. If no structure has been defined, block 402 goes to block 404 which creates a MAC structure. The contents of the MAC structure are shown below with respect to FIG. 5.

After creating the MAC structure, block 406 appends the structure to the active MAC list, which is a list of all station MACs that have sent NIFs during the current monitor timer period. Block 408 then stores the upstream neighbor address (UNA) from the NIF into the MAC structure for the MAC that sourced the NIF before FIG. 4 returns to its caller.

If the MAC structure had already been defined, block 402 goes to block 410 which determines whether the MAC structure had been placed on the removed MAC list. The removed MAC list is a list of MACs for stations that had at one time been active, but did not appear to be active in previous monitor timer periods. If the frame is on the removed MAC list, block 410 goes to block 412 which transfers the MAC back to the active MAC list. In either case, control then goes to block 408 which stores the upstream neighbor address into the MAC structure before returning to its caller.

FIG. 5 shows a block diagram of the MAC data structure referenced in FIG. 4. Referring now to FIG. 5, section 502 of the MAC structure stores the MAC address for this MAC, section 504 stores the MAC address for the upstream neighbor to this MAC, and section 506 stores the network address for the downstream neighbor to this MAC. Section 508 stores a pointer to the MAC data structure of the upstream neighbor to this MAC, and section 510 stores a pointer to the MAC data structure for the downstream neighbor to this MAC. Section 512 stores a pointer to the port data structure for the upstream neighbor of this MAC, and section 514 stores a pointer to the port data structure of the downstream neighbor of this MAC.

Figure 6:
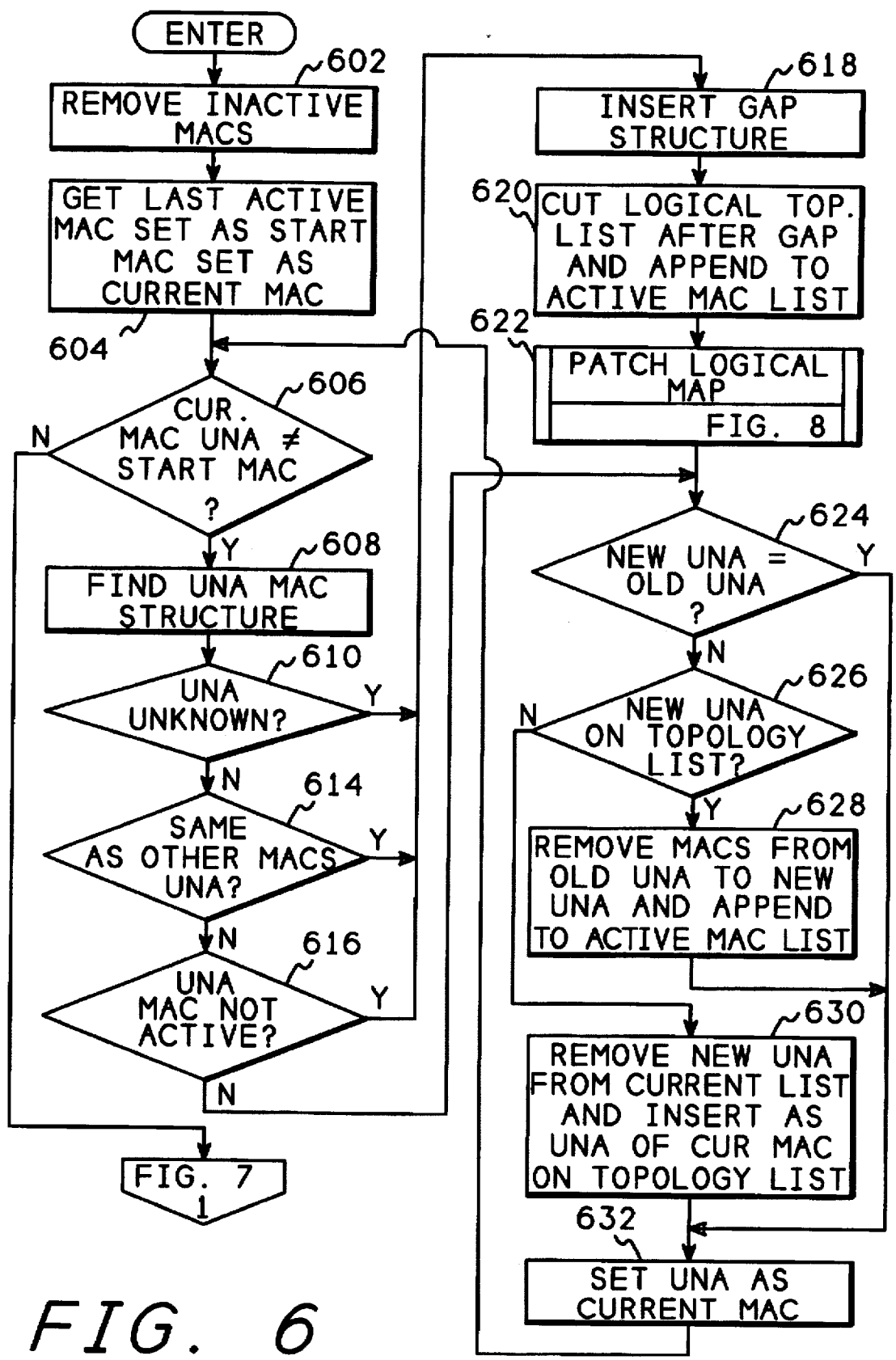
FIGS. 6 and 7 show a flowchart of the process of the BUILD LOGICAL MAP state of FIG. 3.
Figure 7:
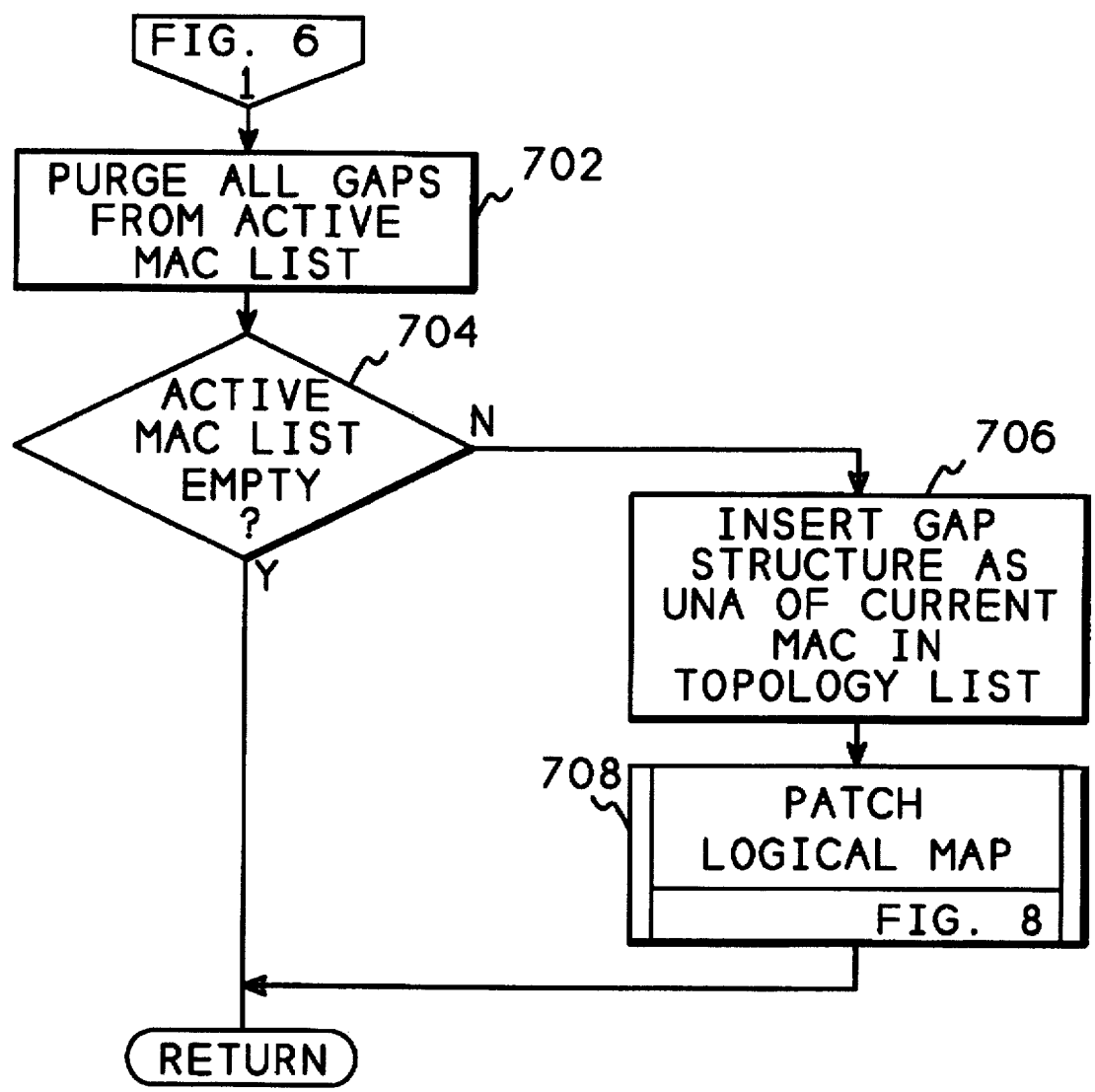
Figure 8:
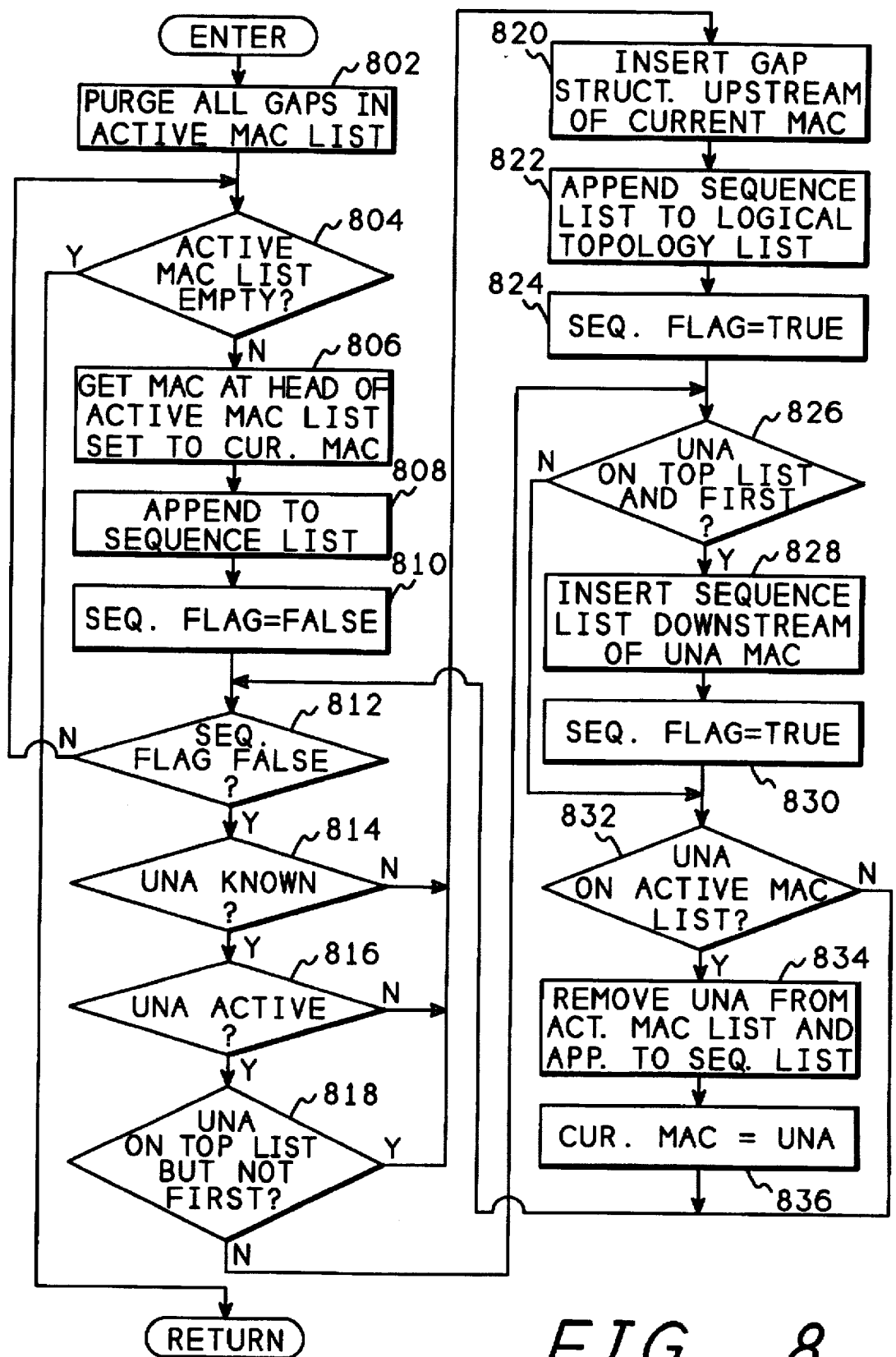
FIG. 8 shows a flowchart of the patch logical map process card from FIGS. 6 and 7.

FIGS. 6, 7, and 8 show a flowchart of the process performed in the build logical map state 318 of FIG. 3. Referring now to FIGS. 6, 7, and 8, after entry on FIG. 6, block 602 removes inactive MACs from the logical topology list. That is, all MACs that did not source a NIF over the last monitor period are considered inactive, and therefore are removed from the logical topology list and placed on the inactive MACs list. The logical topology list is a list of the MACs in the token path order of the network, as they were defined the last time this logical mapping function was performed. If this is the first performance of the logical mapping function, the logical topology list will be created as an empty list.

Block 604 then gets the last active MAC, that is, the MAC that sourced the last NIF received, and sets this MAC into a variable as the start MAC and also sets it as the current MAC. The system starts with this MAC, since it has the best chance of still being in the ring at the end of the monitor period. Block 606 compares the upstream neighbor address within the current MAC to the address of the start MAC and if those are not equal control transfers to block 608. These will ordinarily be unequal after just coming from block 604, and they will remain unequal until the token path has been completely traversed. They would be equal after just completing block 604 only if the network only had two stations.

Block 608 then finds the upstream neighbor address MAC structure and examines this structure. Block 610 determines whether the upstream neighbor address of the current MAC is unknown and if not, transfers to block 614 which determines whether this upstream neighbor MAC is also the upstream neighbor of any other MACs in the system and if not, transfers to block 616 which determines whether the upstream neighbor MAC is active. If the upstream neighbor is unknown, or if it is the upstream neighbor of more than one MAC, or if the upstream neighbor MAC is not active, control goes to block 618 which inserts a gap structure in place of the upstream neighbor. A gap structure is identical to the MAC structure shown in FIG. 5, except that is has no MAC address because the MAC is not known.

Block 620 then cuts the logical topology list after this gap and appends the remaining MACs on the logical topology list after the gap to the active MAC list. That is, the actual logical location of those MACs after the gap is not known, so they are simply placed on the active MAC list. Block 622 then calls FIG. 8 to patch the logical map and handle the situation of the gap.

After returning from FIG. 8, or if the conditions of block 610, 614, and 616 were not satisfied, control goes to block 624 which determines whether the new upstream neighbor address is equal to the old upstream neighbor address. That is, does this MAC have a new upstream neighbor from the last time it was processed. If the MAC does have a new upstream neighbor, block 624 transfers to block 626 which determines whether the new upstream neighbor is on the topology list. If the new upstream neighbor is on the topology list, control goes to block 628 which removes MACs between the old upstream neighbor, including the old upstream neighbor MAC, up to, but not including, the new upstream neighbor MAC, and appends these MACs to the active MAC list. These MACs are removed from the topology list because they are not longer in the location on the topology list that they used to be, because the upstream neighbor has changed. Control then goes to block 632.

If the new upstream neighbor is not on the topology list, block 626 goes to block 630 which removes the new upstream neighbor from which ever current list it was on and inserts it as the upstream neighbor of the current MAC on the topology list.

If the new upstream neighbor was equal to the old upstream neighbor in block 624, or after performing the function of block 628 or block 630, control goes to block 632 which sets the upstream neighbor MAC as the current MAC and returns to block 606 to process this MAC.

After all station MACs in the network have been processed, the current MAC upstream neighbor address becomes equal to the start MAC upstream neighbor address and block 606 transfers to FIG. 7 and block 702. Block 702 purges all gap structures from the active MAC list. These structures may be left over from the patch logical map function of FIG. 8 or from the process of FIG. 6. Block 702 then determines whether the active MAC list is empty, and if it is not, block 704 transfers to block 706 which inserts a gap structure as the upstream neighbor of the current MAC in the topology list. Since the active MAC list is not empty, at least one MAC did not link into the existing topology list. The system attempts to place the remaining MACs from the active MAC list into the topology list. This is done when block 708 calls FIG. 8 to patch the logical map, which will also process the remaining MACs on the active MAC list. After patching the logical map, or if the active MAC list is empty, FIG. 7 returns to its caller.

FIG. 8 shows a flowchart of the patch logical map function called from block 622 and block 708. Referring now to FIG. 8, after entry, block 802 purges all gaps in the active MAC list. Block 804 then determines whether the active MAC list is empty and if not, transfers to block 806 which gets the MAC at the head of the active MAC list and sets this to the current MAC. Block 808 then unhooks the MAC from the head of the active MAC list and appends it to a sequence list which will be used by this process. The sequence list is a sequence of MACs that connect to each other, but their location in the topology list is unknown. Once the location for the sequence is determined, the sequence is connected into the topology list. Block 810 the sets a sequence flag to false.

Block 812 checks the state of the sequence flag. If the sequence flag is false, block 812 transfers to block 814 which determines whether the upstream neighbor of the current MAC is known and if it is known, block 814 transfers to block 816 which determines whether the upstream neighbor is an active MAC, that is, whether it sent a NIF during the current monitor period. If it is active, block 816 transfers to block 818 which determines whether the upstream neighbor is on the topology list but is not the first MAC of a sequence on the topology list.

If the upstream neighbor address is unknown, or the upstream neighbor is not active, or if the upstream neighbor is on the logical topology list but not the first MAC of a sequence of MACs connected by their upstream and downstream neighbor addresses, control transfers to block 820 which inserts a gap structure upstream of the current MAC. Because of these conditions, this MAC is the end of a sequence, so block 822 appends the sequence to the logical topology list and block 824 sets the sequence flag to True.

After setting the sequence flag to True, or if the upstream neighbor address was known and the upstream neighbor was active and the upstream neighbor was the first element of a sequence on the topology list, control goes to block 826 which again determines whether the upstream neighbor was on the topology list and is the first of a sequence. If so, control goes to block 828 which inserts the sequence list downstream of the upstream neighbor MAC and block 830 sets the sequence flag equal to True.

After setting the sequence flag, or if the upstream neighbor was on the topology list and was also the first of a sequence, control goes to block 832 which determines whether the upstream neighbor is on the active MAC list and if so, control transfers to block 834 which removes the upstream neighbor from the active MAC list and appends it to the sequence list. Block 836 then sets the current MAC to the upstream neighbor MAC.

If the upstream neighbor was not on the active MAC list, or after setting the current MAC to the upstream neighbor address, control goes back to block 812 which checks the sequence flag. If the sequence flag is True, control goes to block 804 which determines whether the active MAC list is empty. After all active MACs on the list have been processed, block 804 returns to FIG. 6 or 7 from which it was called.

Figure 9:
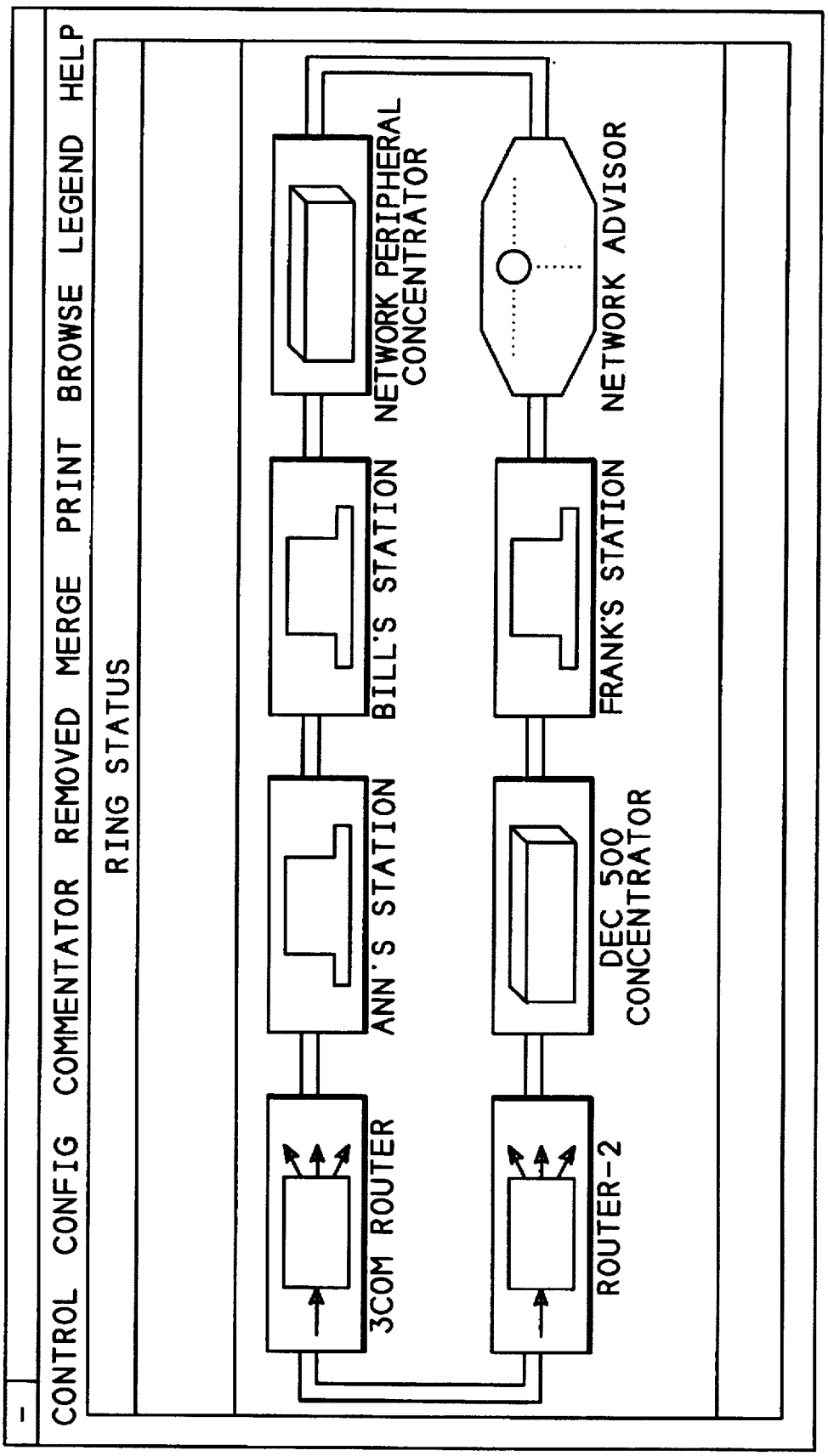
FIG. 9 shows a screen display of the logical map constructed by the process of FIG. 3.

FIG. 9 shows a screen display including a window that illustrates the logical topology list built by the process of FIGS. 3–8. This screen shows the network of FIG. 1 in the token path order, which is the logical view of the network.

Figure 10:
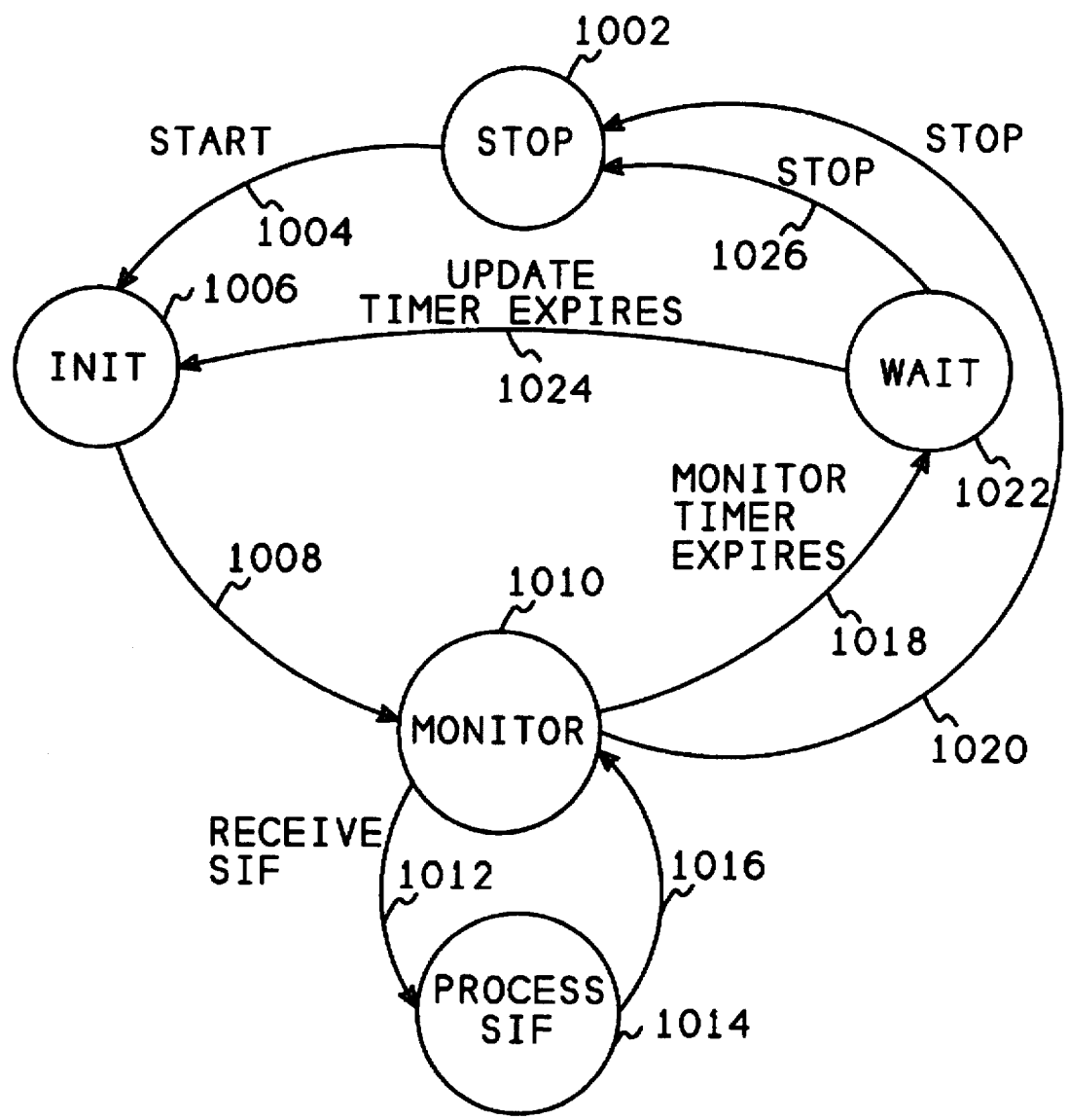
FIG. 10 shows a state diagram of the software for physically mapping the network.
Figure 15:
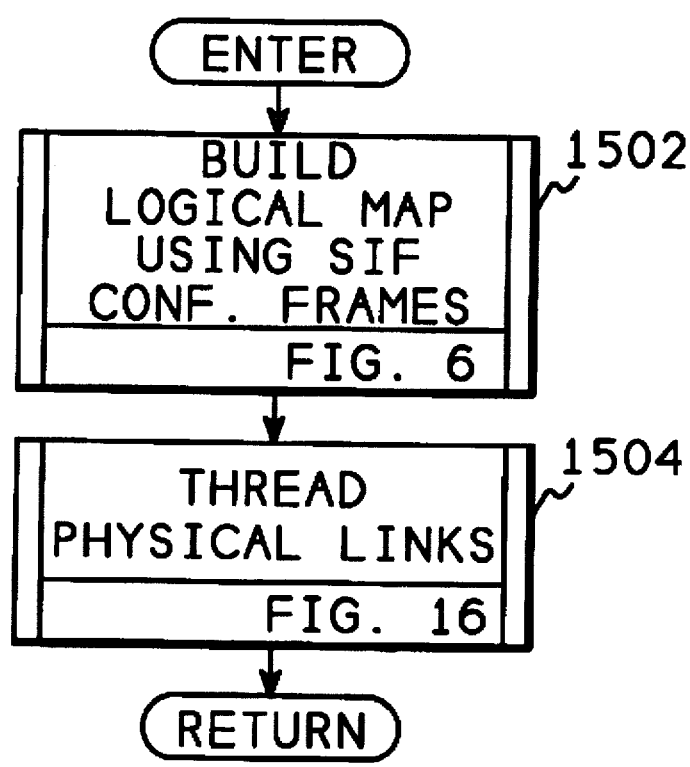
FIG. 15 shows a flowchart of the process of the WAIT state of FIG. 10.
Figure 16:
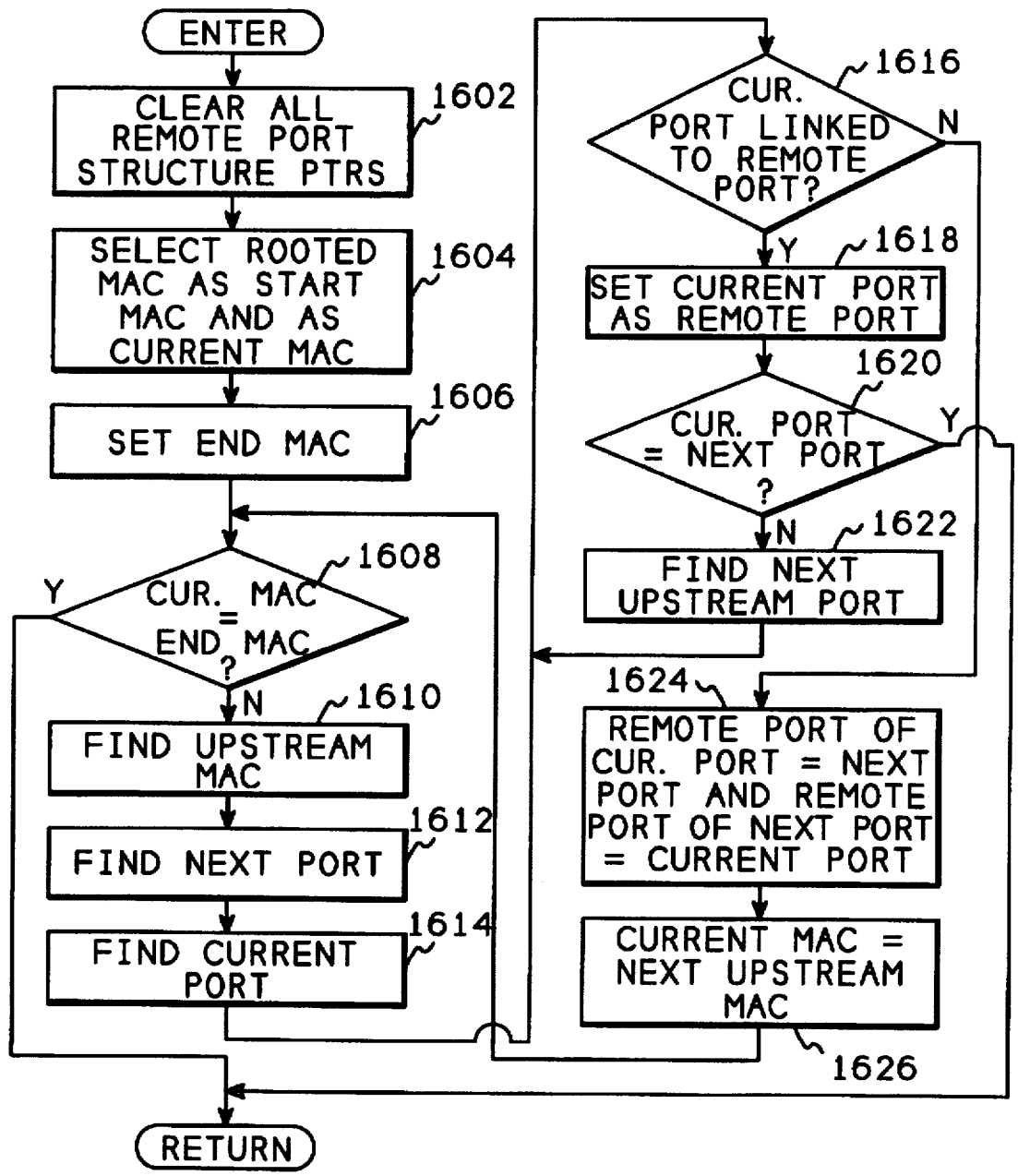
FIG. 16 shows a flowchart of the thread physical links called from FIG. 15.

FIG. 10 shows a state diagram of the physical mapping process which would be called by the FDDI ring manager software 220 (FIG. 2) if the user requests a display of a physical map of the network. Referring now to FIG. 10, after the user requests a physical map be displayed, control enters FIG. 10 at the STOP state 1002. Once the user presses the start button, control transfers to the INIT state 1006 which performs the initialization process described below with respect to FIG. 11. Control then immediately transfers to the MONITOR state 1010 and waits for a station information frame (SIF) to be received. Once a SIF is received, control transfers to PROCESS SIF state 1014 which performs the function described below with respect to FIG. 12. After processing the SIF, control goes back to MONITOR state 1010. The INIT state 1006 set a monitor timer, and once it expires, control transfers to the WAIT state 1022 where the process described below with respect to FIGS. 15 and 16 is performed. The INIT process 1006 also sets an update timer, and if this timer expires, control transfers back to the INIT process and the physical topology mapping process repeats. If, however, the user presses the stop button, either while in the monitor state 1010 or the wait state 1022, control returns to the stop state and the physical topology process is terminated.

Figure 11:
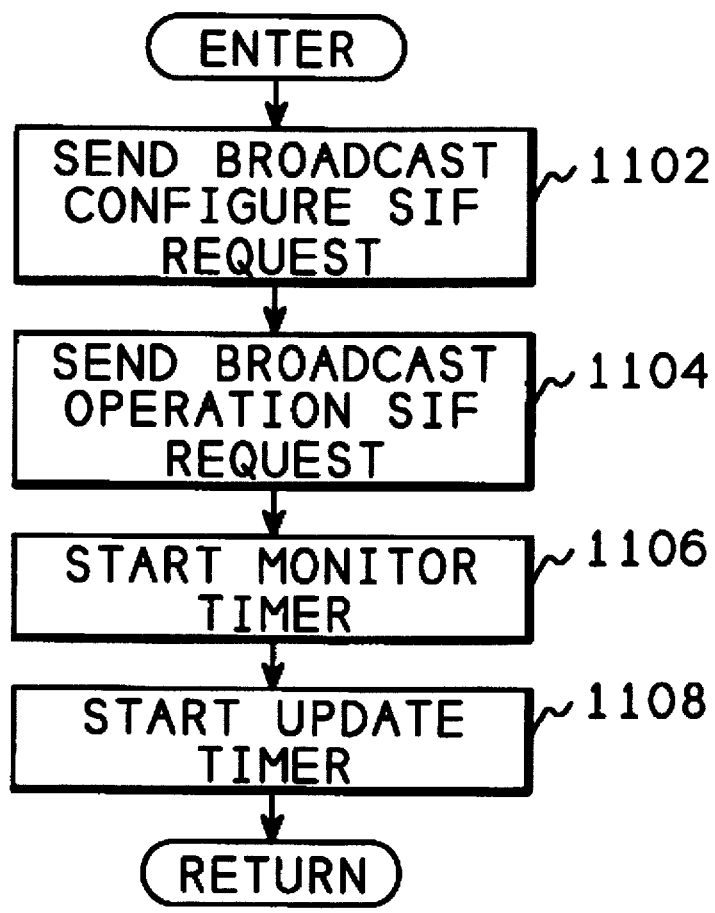
FIG. 11 shows a flowchart of the process for the INIT state of FIG. 10.

FIG. 11 shows the process performed in the INIT state 1006 of FIG. 10. Referring now to FIG. 11, after entry, block 1102 sends a broadcast configure SIF request to the network. This request goes to all stations on the network, and causes each of them to send a station information frame containing information about the current state of the station. After sending the broadcast configure SIF request, block 1104 sends a broadcast operation SIF request. Block 1106 then sets the monitor timer to ten seconds, which is a sufficient time to receive all the SIFs from the other stations. Block 1108 then sets the update timer to some user defined interval, which must be greater than the monitor timer. The update timer is set by the user to define an interval after which the user wishes the network to be mapped a second or subsequent times. By using this timer, the user can cause the system to repeatedly refresh the physical map of the system, at the interval defined by the user. After setting the update timer, block 1108 returns to its caller.

Figure 12:
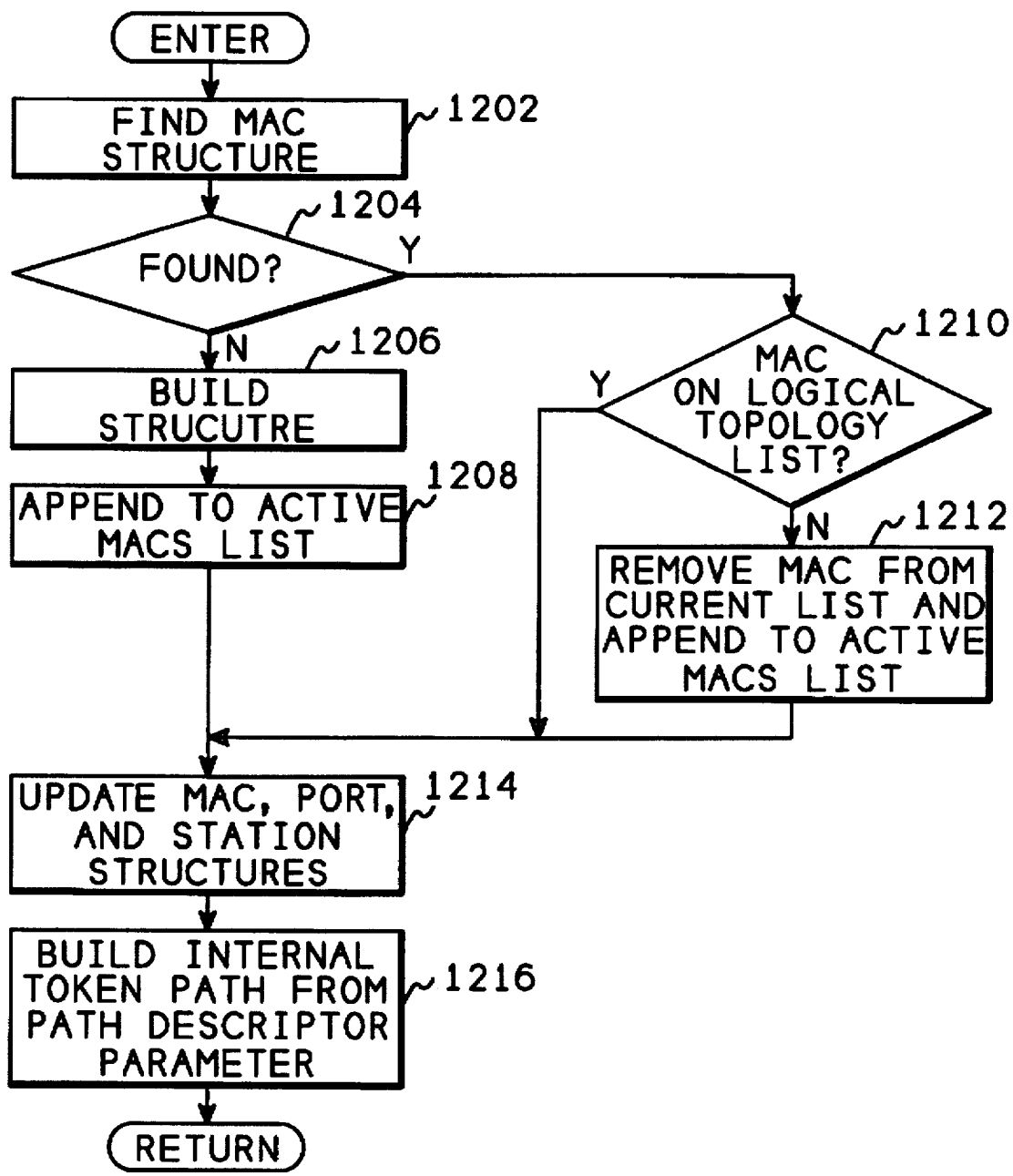
FIG. 12 shows a flowchart of the PROCESS SIF state of FIG. 10.

FIG. 12 shows a flowchart of the PROCESS SIF state 1014 of FIG. 10. Referring now to FIG. 12, after entry, block 1202 finds the MAC structure for the MAC station that sent the SIF. Block 1204 determines whether the MAC structure was found, and if it was not, block 1204 transfers to block 1206 which builds a MAC structure for the station and then block 1208 appends the MAC structure to the active MACs list.

If the MAC structure was found, block 1204 transfers to block 1210 which determines whether the MAC structure is already on the logical topology list. If not, block 1210 goes to block 1212 which removes the MAC structure from whatever current list it is on and appends it to the active MACs list.

After removing the MAC from the current list, or after building and appending a MAC structure, control goes to block 1214. Block 1214 updates the MAC structure, port structure, and station structure for the MAC that sent the SIF. Block 1216 then builds the internal token path from the path descriptor information sent back with the SIF. The internal token path was described above with respect to FIG. 1, and is represented by the dashed lines in FIG. 1. After building the internal token path, FIG. 12 returns to its caller.

FIG. 13 shows a block diagram of the station structure which is used by the process of FIGS. 12 and FIGS. 15–16. Referring now to FIG. 13, section 1302 defines information common to all stations, such as the station network ID, the name of the station, the type of the station, the number of MACs present in the station, the number of M type ports in the station, and the number of A/B/S type ports contained in the station. Section 1304 is an array containing an entry for each port of the station, as well as an entry for the station's MAC. Each element of this array defines the type of the port, and a pointer to the port structure, defined below with respect to FIG. 14.

FIG. 14 shows a definition of the data structure for each port of a station. Referring now to FIG. 14, section 1402 defines the type and current status of the port, such as active or inactive. Section 1404 defines whether the port is attached to the primary or secondary ring, if it is attached to the trunk ring. Section 1406 contains a pointer to the previous port structure within this station and section 1412 defines a pointer to the next port structure within this station. Section 1408 is a pointer to the station structure for this station and section 1410 is a pointer to the remote port connected to this port on the network. That is, if this port contains a connection to another station, section 14 contains a pointer to the port structure of the port of that station to which this port is connected.

FIGS. 15 and 16 show a flowchart of the process performed in the wait state 1022. This process is called thread physical links, and it connects all the pointers in the MAC structure, station structure, and port structures defined above, in order to display the physical topology of the network.

Referring now to FIG. 15, after entry, block 1502 calls the process of FIG. 6 to build the logical map for the network, as described above. In this instance, FIG. 6 uses the upstream neighbor addresses and downstream neighbor addresses form the SIF configuration frames to build the logical map of the network. Block 1504 then calls FIG. 16 to perform the thread physical links process.

FIG. 16 shows a flowchart of the thread physical links process called from FIG. 15. Referring now to FIG. 16, after entry, block 1602 clears all remote port structure pointers, that is, the pointers described above with respect to section 1410 of FIG. 14. Block 1604 then selects one of the rooted MACs as the start and current MACs. Rooted MACs were described above with respect to FIG. 1, and comprised that sub-section of the MACs that are located on the trunk ring. Any one of these rooted MACs may be selected in block 1604 to start the thread physical links process.

Block 1606 then sets the end MAC to be the first MAC downstream of the start MAC that belongs to a station other than the same station as the start MAC. Since a station may have more than one MAC, block 1606 will not pick a second MAC within the same station.

Block 1608 then determines whether the current MAC is equal to the end MAC, and if it is, returns to its caller since the physical thread process is complete. If the current MAC is not equal to the end MAC, block 1608 goes to block 1610 which finds the first MAC upstream of the current MAC on the logical topology list that belongs to a different station other than the station containing the current MAC. This MAC is then called the next MAC. After completing this step, the process has two MACs that belong to neighboring stations.

The next step is to find the end ports for the physical connection between these two stations. Block 1612 traverses the internal token path from the next MAC in the downstream direction until a port is reached. This is called the next port. Block 1614 finds a port by traversing the internal token path from the current MAC in the upstream direction until a port is reached. This port is called the current port. Block 1616 then determines whether the current port is already linked to a remote port. If so, block 1616 transfers to block 1618 which sets the current port as the remote port and then block 1620 determines whether the current port is the same as the next port. If this is the case, block 1620 returns to the caller of FIG. 16 since a wrapped station has been detected. If the current port is not equal to the next port, block 1620 goes to block 1622 which traverses the internal token path from the current port in the upstream direction until a port is found and then returns to block 1616. This process continues until the current port is not linked to a remote port wherein control goes to block 1624.

At this point the process has two end ports of a physical connection so block 1624 links these two ports together by setting the remote port of the current port equal to the next port and by setting the remote port of the next port equal to the current port. Block 1626 then sets the current MAC equal to the next upstream MAC and returns to block 1608. This process continues until the entire network has been traversed at which point the current MAC equals the end MAC and block 1608 returns to its caller.

Figure 17:
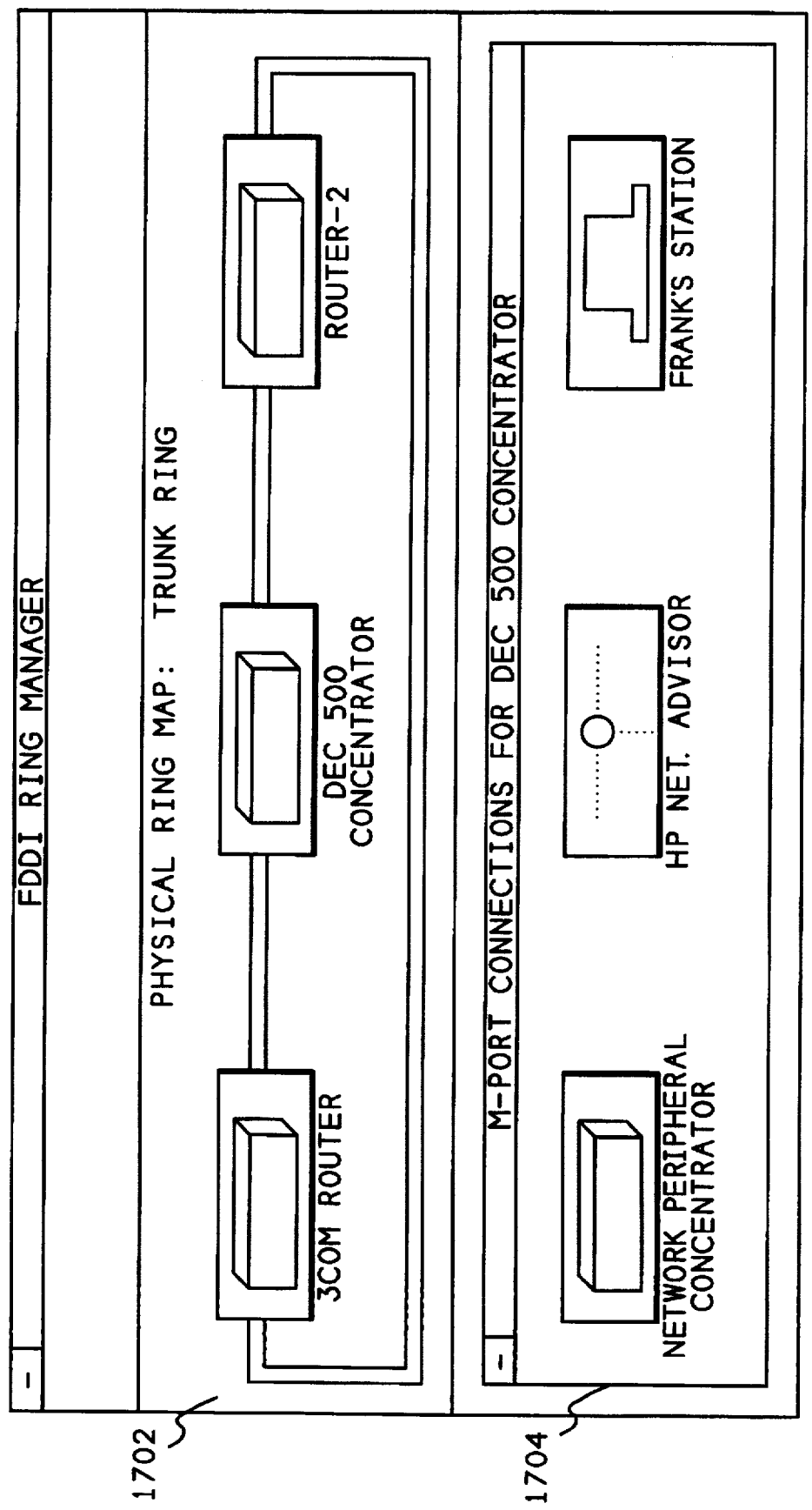
FIG. 17 shows a screen display of the physical map constructed by the process of FIG. 10.

FIG. 17 shows a screen display of the physical topology as determined by the above described process. FIG. 17 shows the trunk ring which comprises the 3COM Router, the DEC 500 Concentrator and ROUTER-2. For each of the stations shown in the trunk ring, the user can select that station and have the stations below it displayed on the bottom section of the screen 1704. In this example, the user has selected the DEC 500 Concentrator to be displayed in the window 1704. Window 1704 shows that the Network Peripheral Concentrator, the HP Network Advisor, and Frank's Station are connected directly to the DEC 500 Concentrator. This reflects the network, as described above with respect to FIG. 1.

Having thus described a presently preferred embodiment of the present invention, it will now be appreciated that the aspects of the invention have been fully achieved, and it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

What is claimed is:

1. A method for constructing and displaying a map of the connections between stations of a token ring type of computer network, said method comprising the steps of:
  (a) receiving neighbor information management information data frames from each active station within said network;
  (b) defining a data structure for each active station on said network, wherein said data structure identifies the station immediately upstream of a station for which the data structure is defined;
  (c) building a station list within a memory of a computer system that receives said data frames, wherein said station list links said stations in an order that each receives a token passed between stations of said network, comprising the steps of
    (c1) selecting one of said active stations for said station list, wherein said active station has not been previously selected,
    (c2) if said active station selected in step (c1) has identified an upstream station immediately upstream of said station and said upstream station is an active station, and said upstream station is not the upstream station of any other station, placing said upstream station on said station list, otherwise placing a gap structure on said station list, wherein said gap structure defines an unknown upstream station, and (c3) repeating steps (c1) through (c2) for each station that has sent neighbor information;

(d) transmitting a request to all stations of said network to request station management information;

(e) receiving station management information data frames from each active station within said network;

(f) building a port connection data structure within a memory of a computer system that receives said data frames, wherein said port connection data structure contains connections between each of said stations of said network; and (g) displaying said station list and said port connection data structure on a display device connected to said computer system.

2. The method of claim 1 wherein step (f) further comprises the step of:

(f1) constructing said port connection data structure as a plurality of station data structures, one station data structure for each active station on said network, wherein each of said station data structures provides a plurality of port data structures, one port data structure for each connection port within a station, and further constructing connection elements between said port data structures, wherein said connection elements represent physical connections between ports of said stations.

3. The method of claim 1 further comprising the steps of:

(h) establishing a timer having a value entered by a user of said method; and (i) repeating steps (a) through (h) when a time value in said timer is exceeded.

4. The method of claim 1 wherein step (e) further comprises the step of:

(e1) waiting a predetermined amount of time for said station information management data frames to be received from all active stations on said network before proceeding with step (f).

5. The method of claim 1 wherein step (c2) further comprises the steps of:

(c2a) after inserting a gap structure on said station list, searching the active stations for connected sequences of stations, and inserting these sequences into the station list.

6. The method of claim 1 wherein said network comprises a fiber distributed data interface network.

7. A method for constructing and displaying a map of the logical connections between stations of a token ring type of computer network, said method comprising the steps of:

(a) receiving neighbor information management information data frames from each active station within said network;

(b) defining a data structure for each active station on said network, wherein said data structure identifies the station immediately upstream of a station for which the data structure is defined;

(c) building a station list within a memory of a computer system that receives said data frames, wherein said station list links said stations in an order that each receives a token passed between stations of said network, said building comprising the steps of (c1) selecting one of said active stations for said station list, wherein said active station has not been previously selected, (c2) if said active station selected in step (c1) has identified an upstream station immediately upstream of said station and said upstream station is an active station, and said upstream station is not the upstream station of any other station, placing said upstream station on said station list, otherwise placing a gap structure on said station list, wherein said gap structure defines an unknown upstream station, and (c3) repeating steps (c1) through (c2) for each station that has sent neighbor information; and (d) displaying said station list on a display device connected to said computer system.

8. The method of claim 7 wherein step (c2) further comprises the steps of:

(c2a) after inserting a gap structure on said station list, searching the active stations for connected sequences of stations, and inserting these sequences into the station list.

9. The method of claim 7 wherein said network comprises a fiber distributed data interface network.

* * * * *